(12) United States Patent
Ensfield et al.

(10) Patent No.: US 10,823,593 B2
(45) Date of Patent: Nov. 3, 2020

(54) ENGINE EXHAUST FLOW MEASUREMENT WITH PULSATION COMPENSATION

(71) Applicant: Sensors, Inc., Saline, MI (US)

(72) Inventors: Carl D. Ensfield, Saline, MI (US); David R. Booker, Ann Arbor, MI (US)

(73) Assignee: Sensors, Inc., Saline, MI (US)

( * ) Notice: Subject to any disclaimer, the term of this patent is extended or adjusted under 35 U.S.C. 154(b) by 0 days.

(21) Appl. No.: 16/298,080

(22) Filed: Mar. 11, 2019

(65) Prior Publication Data

US 2019/0277674 A1  Sep. 12, 2019

Related U.S. Application Data

(60) Provisional application No. 62/640,760, filed on Mar. 9, 2018.

(51) Int. Cl.

| | | |
|---|---|---|
| *G01F 1/38* | (2006.01) | |
| *G01F 1/72* | (2006.01) | |
| *F16L 55/04* | (2006.01) | |
| *G01F 1/704* | (2006.01) | |

(52) U.S. Cl.
CPC ............... *G01F 1/38* (2013.01); *F16L 55/04* (2013.01); *G01F 1/704* (2013.01); *G01F 1/72* (2013.01)

(58) Field of Classification Search
CPC .... G01F 1/38; G01F 1/70; G01F 1/702; F16L 55/04
See application file for complete search history.

(56) References Cited

U.S. PATENT DOCUMENTS

| | | | | |
|---|---|---|---|---|
| 4,183,338 A | * | 1/1980 | Lindberg | F02M 19/03 123/25 E |
| 4,527,953 A | * | 7/1985 | Baker | F04B 49/065 417/38 |
| 6,148,656 A | | 11/2000 | Breton | |

(Continued)

FOREIGN PATENT DOCUMENTS

EP        0154531        11/1988

OTHER PUBLICATIONS

Brochure disclosing SEMTECH-EFM3, Published by Sensor Inc. Published prior to Jan. 1, 2016.

(Continued)

*Primary Examiner* — Jewel V Dowtin
(74) *Attorney, Agent, or Firm* — Gardner, Linn, Burkhart & Ondersma LLP

(57) ABSTRACT

An engine exhaust flow meter and method of measuring engine exhaust flow rate includes a flow tube and a differential pressure meter that is adapted to measure differential pressure in exhaust flow through the flow tube. A computer samples the differential pressure meter at a rate that is greater than the pulsation of exhaust flow to obtain a differential pressure signal. The computer is responsive to the differential pressure signal to compute a mean differential pressure value. The computer is responsive to the differential pressure signal to compute a mean magnitude of pressure pulses. The computer determines a compensation factor as a function of the mean magnitude of pressure pulses and adjusts the mean differential pressure value as a function of the compensation factor to obtain an engine exhaust flow value that is flow pulsation compensated.

20 Claims, 5 Drawing Sheets

(56) References Cited

U.S. PATENT DOCUMENTS

| | | | |
|---|---|---|---|
| 6,725,731 B2 | 4/2004 | Wiklund et al. | |
| 6,865,472 B2 | 6/2005 | Nakamura | |
| 7,110,878 B2 | 9/2006 | Nakamura et al. | |
| 8,280,645 B2 | 10/2012 | Nakamura | |
| 9,617,933 B2* | 4/2017 | Liu | F02M 26/64 |
| 2002/0059797 A1* | 5/2002 | Kreso | G01F 1/42 |
| | | | 60/602 |
| 2003/0136196 A1 | 7/2003 | Wiklund et al. | |
| 2007/0000218 A1* | 1/2007 | Wirth | F01N 13/0097 |
| | | | 55/283 |
| 2007/0251214 A1* | 11/2007 | Nishino | F02D 41/029 |
| | | | 60/277 |
| 2009/0114168 A1* | 5/2009 | Lee | F02M 27/045 |
| | | | 123/3 |
| 2011/0283705 A1* | 11/2011 | Oliver | F42D 3/00 |
| | | | 60/698 |
| 2015/0020504 A1* | 1/2015 | Nicole | F01N 9/002 |
| | | | 60/274 |

OTHER PUBLICATIONS

Brochure disclosing SEMTECH EFM2, Published by Sensor Inc. Published prior to Jan. 1, 2016.

Brochure disclosing SEMTECH hs-EFM High Speed Exhaust Flow Meter, Published by Sensor Inc. Published prior to Jan. 1, 2016.

Brochure disclosing SEMTECH EFM3 High Speed Exhaust Flow Meter, Published by Sensor Inc. Published prior to Jan. 1, 2016.

Brochure disclosing SEMTECH EFM-HS High Speed Exhaust Flow Meter, Published by Sensor Inc. Published prior to Jan. 1, 2016.

Brochure disclosing SEMTECH-FEM Fuel Economy Meter, Published by Sensor Inc. Published prior to Jan. 1, 2016.

Brochure disclosing SEMTECH-EFM3 Vehicle Exhaust Flow Meter, Published by Sensor Inc. Published prior to Jan. 1, 2016.

Sensors Inc. Users Manual, Entitled "Vehicle Exhaust Flow Meter SEMTECH EFM", Last Updated May 20, 2005 by Vahan D. Shahinian.

Sensors Inc. Users Manual, Entitled "Vehicle Exhaust Flow Meter SEMTECH EFM", Last Updated May 18, 2007 by Vahan D. Shahinian.

Sensors Inc. Users Manual, Entitled "High Speed Exhaust Flow Meter", Last Updated Jan. 17, 2012 by Laura J. Dillmann.

Aerospace Sciences & Aviation Technology, M. Metwally, "Review of Compressible Pulsating Flow Effects on System Performance", May 26, 2009, 13th International Conference on Aerospace Sciences & Aviation Technology, ASAT-13.

American School of Gas Measurement Technology, Robert J. McKee, "Pulsation effects on orifice metering considering primary and secondary elements", Jan. 12, 2004, ASGMT.com/paper/2004, Southwest Research Institute, 6220 Culebra Road, San Antonio, TX 78238.

* cited by examiner

ENGINE EXHAUST FLOW MEASUREMENT WITH PULSATION COMPENSATION

CROSS REFERENCE TO RELATED APPLICATION

The present application claims the filing benefits of U.S. provisional application, Ser. No. 62/640,760, filed Mar. 9, 2018, which is hereby incorporated herein by reference in its entirety.

BACKGROUND OF THE INVENTION

The present invention is directed to an engine exhaust flow meter and method of measuring engine exhaust flow rate and, in particular, to such measuring engine exhaust flow in the presence of significant pressure pulsation.

The use of portable emissions testing systems (PEMS) requires direct exhaust flow measurements. These measurements are complicated by the presence of pressure pulsations which are inherent in piston engines. Small displacement gasoline engines with four (or fewer) cylinders in particular can produce pulsations with very large amplitudes that bias readings high.

Magnitude of the pressure pulses in a four cylinder engine may be up to 600% higher than the mean pressure. Also negative pressure spikes are present, which indicate reverse flowrate. Conventional flow measurement standards specify that these pressure pulses should not exceed 10% of the mean pressure value.

SUMMARY OF THE INVENTION

The measurement of pulsating flows has been a long standing challenge. One issue is the Inertia effect. It takes more energy (pressure) to reverse the flow due to its inertia than to produce steady flow. The result is an over-estimate by prior techniques of flow due to the higher differential pressures measured. Another issue with prior techniques is that reverse flow is local transitions from turbulent to laminar flows, which create a non-uniform velocity profile.

Flow measurement techniques according to aspects of the invention apply a compensation algorithm based on measurements of the amplitude of differential pressure pulsations to correct the square root average of the differential pressure and calculated flow rate from the effect of pulsations. The differential pressure signals are measured at high speed, such as 2.5 KHz or greater, and the mean pulse magnitude is determined over a time interval, for example 200 msec, and compared to the mean differential pressure value for that time interval. The pulsation modulation is defined as the ratio of the mean pulse magnitude to the mean differential pressure. In addition, an average of the square root of the differential pressures is calculated over the same time interval. The compensation algorithm adjusts the square root average of the differential pressure and calculated flow rate as a function of the pulsation modulation and pipe Reynolds number.

An engine exhaust flow meter and method of measuring engine exhaust flow rate, according to an aspect of the invention, includes a flow tube and differential pressure meter that is adapted to measure differential pressure in exhaust flow through the flow tube. A computer samples the differential pressure meter at a rate that is greater than the pulsation of exhaust flow to obtain a differential pressure signal. The computer is responsive to the differential pressure signal to compute a mean differential pressure value over a certain time interval. The computer is responsive to the differential pressure signal to compute a mean magnitude of pressure pulses over the same time interval. The computer is responsive to the differential pressure signal to compute an average of the square root of the differential pressures over the same time interval. The computer determines a compensation factor as a function of the mean magnitude of pressure pulses and adjusts the square root average of the differential pressure value as a function of the compensation factor to obtain an engine exhaust flow value that is flow pulsation compensated.

A pulsation dampener may be provided that is adapted to mechanically reduce magnitude of flow pulsation in the flow tube. The pulsation dampener may include a flexible bag such as a bag made of silicone. A shield may surround the bag and may be attached to the flow tube at one end portion of the shield and support the bag at an opposite end portion of the shield.

In an embodiment of the present invention, the differential pressure meter includes a pitot tube in the flow tube and a differential pressure sensor sensing pressure across said pitot tube and producing a differential pressure signal that is responsive to forward and reverse flow in the flow tube. The differential pressure sensor may include a plurality of differential pressure sensors connected in parallel. The computer may calculate the mean differential pressure signal over an interval of time and a square root average of the differential pressure signal over an interval of time. The computer may calculate the mean peak to peak amplitude of the differential pressure pulses over an interval of time. The computer may be adapted to compute a pulsation correction factor and a Reynolds number of the flow tube, the pulsation correction factor being a function of the mean peak to peak amplitude of differential pressure pulses divided by mean differential pressure. The computer may be adapted to adjust the square root average of the differential pressure and calculated flowrate by the compensation factor and re-compute the Reynolds number and the compensation factor in an iterative process.

These and other objects, advantages and features of this invention will become apparent upon review of the following specification in conjunction with the drawings.

DESCRIPTION OF THE PREFERRED EMBODIMENTS

Figure 1:
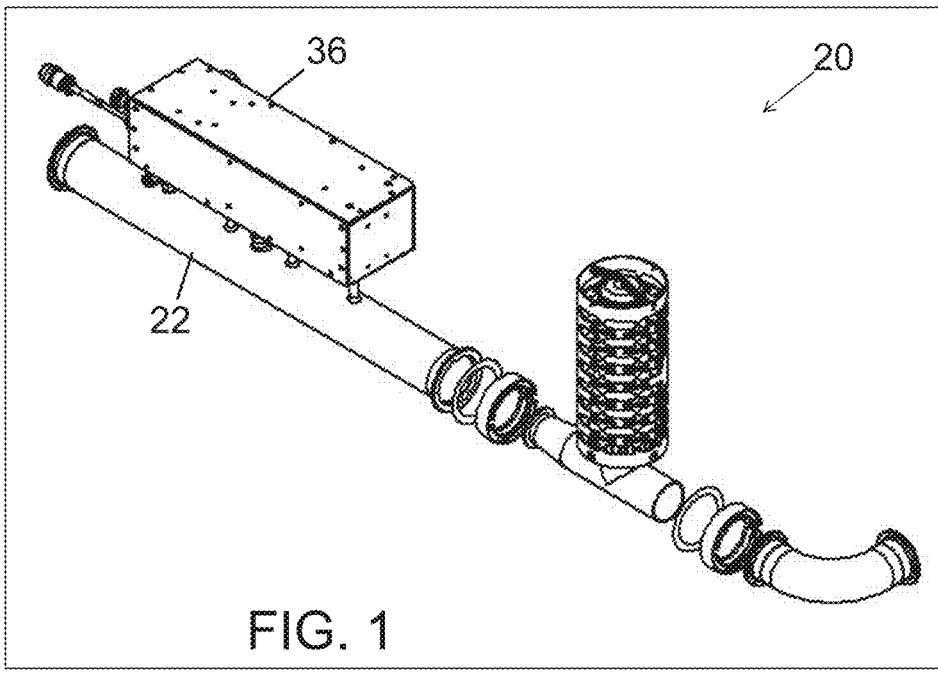
FIG. 1 is a perspective view of a flowmeter assembly according to an embodiment of the invention.
Figure 4:
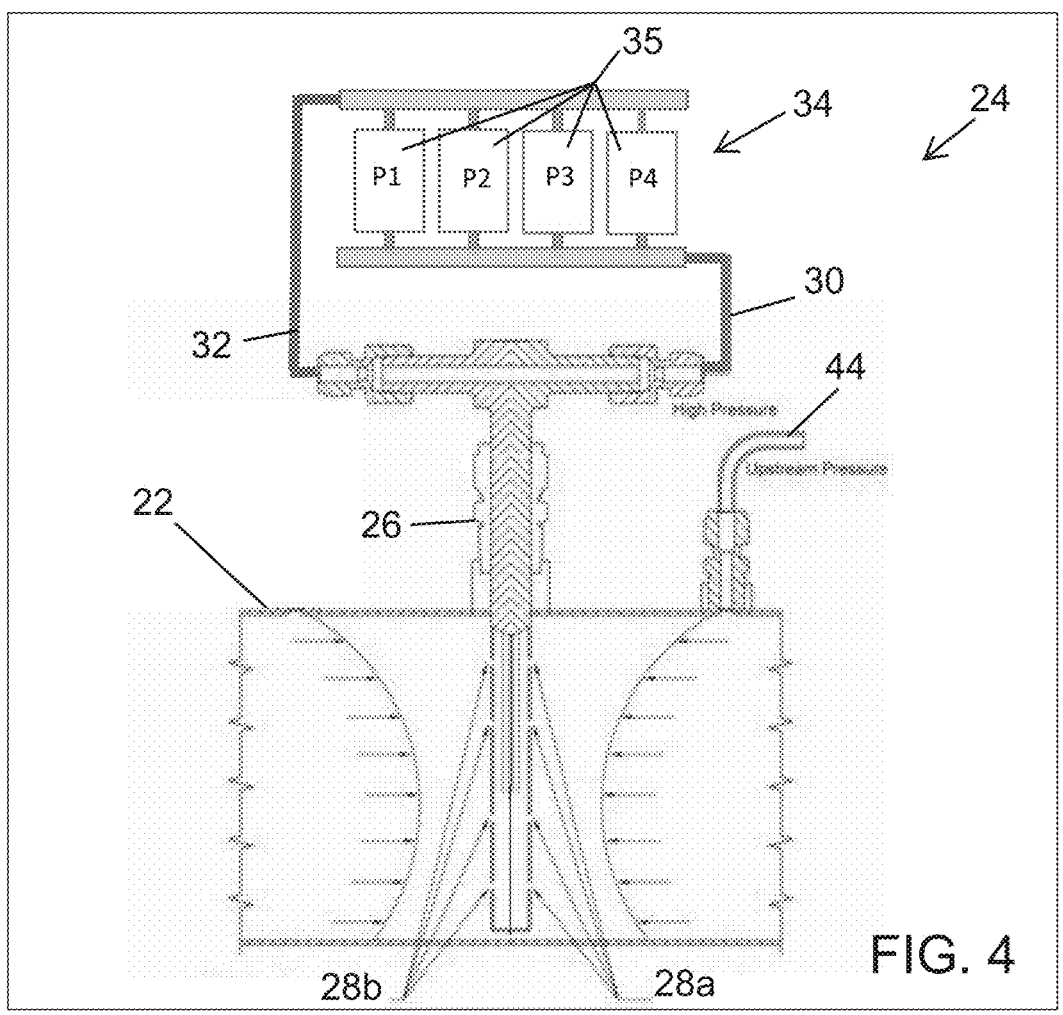
FIG. 4 is a sectional view of a pitot tube illustration of the sensing of reverse flow.

Referring now to the drawings and the illustrative embodiments depicted therein, an engine exhaust flow meter 20 includes a flow tube 22 that is adapted to be connected with the exhaust of an internal combustion engine and a differential pressure meter 24 that is adapted to measure differential pressure in exhaust flow through the flow tube (FIGS. 1 and 4). In the illustrated embodiment, differential pressure meter 24 is made up of a pitot tube 26 that is in flow tube 22 and a differential pressure sensor assembly 34 connected across a high pressure sensing port 30 and a low pressure sensing port 32 of the pitot tube for sensing pressure across said pitot tube and producing a differential pressure signal that is responsive to forward and reverse flow in the flow tube. Pitot tube 26 includes sampling openings 28a facing upstream toward the engine exhaust and sampling openings 28b facing downstream away from the engine exhaust.

Figure 2:
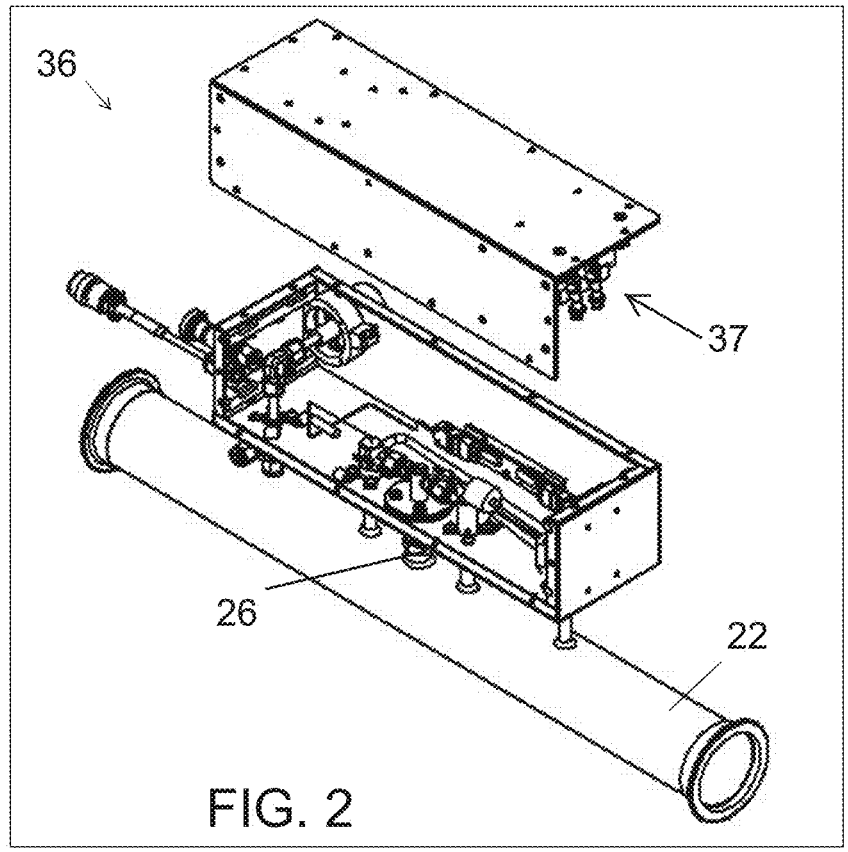
FIG. 2 is an enlarged view of a pressure measurement assembly of the flowmeter assembly of FIG. 1 with the cover removed to reveal detail thereof.
Figure 3:
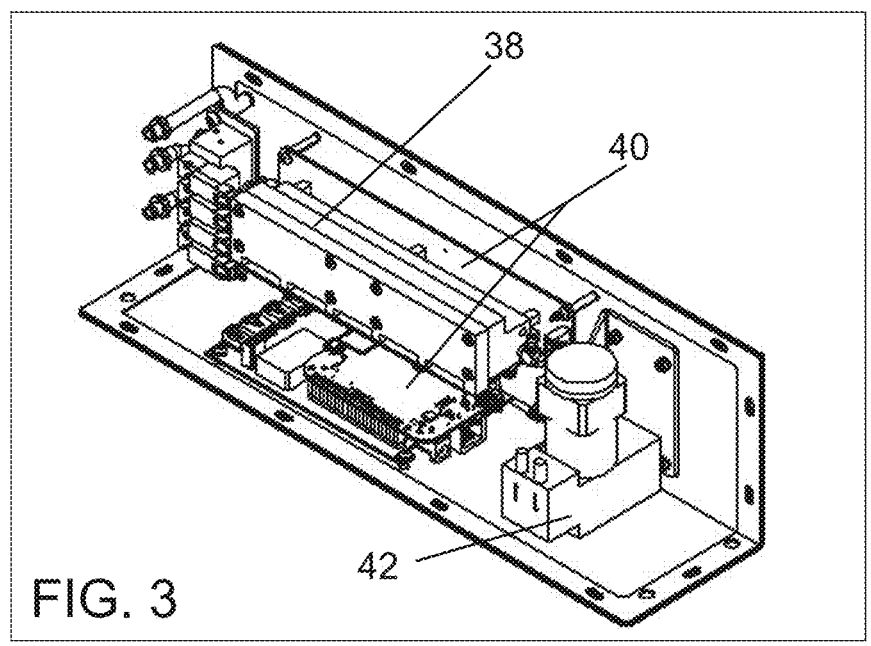
FIG. 3 is a perspective view of components of a high speed pressure sensor and electronics assembly of the flowmeter assembly disposed on the cover depicted in FIG. 2.

A sensing assembly 36 is mounted to flow tube 22 and includes a pressure sensor and electronic assembly 37 having a heated manifold housing 38 for sensing assembly 36 and a computer assembly 40 having a computer such as a microprocessor (FIG. 2). A purge pump 42 is used to back-purge pressure lines and pitot tube 26 for cleaning. An upstream pressure port 44 is connected with flow tube 22 that monitors exhaust pressure connected with a pressure sensor (not shown) that monitors exhaust pressure to determine exhaust density for use in flow calculation as is known in the art (FIG. 4). In the illustrated embodiment, a differential pressure sensor 34 is made up of a plurality of sensors 35 that are connected in parallel across a high pressure port 30 and a low pressure port 32 to measure a wide dynamic range of pressure values. Preferably, up to four orders of magnitude of differential pressures can be processed.

Figure 7:
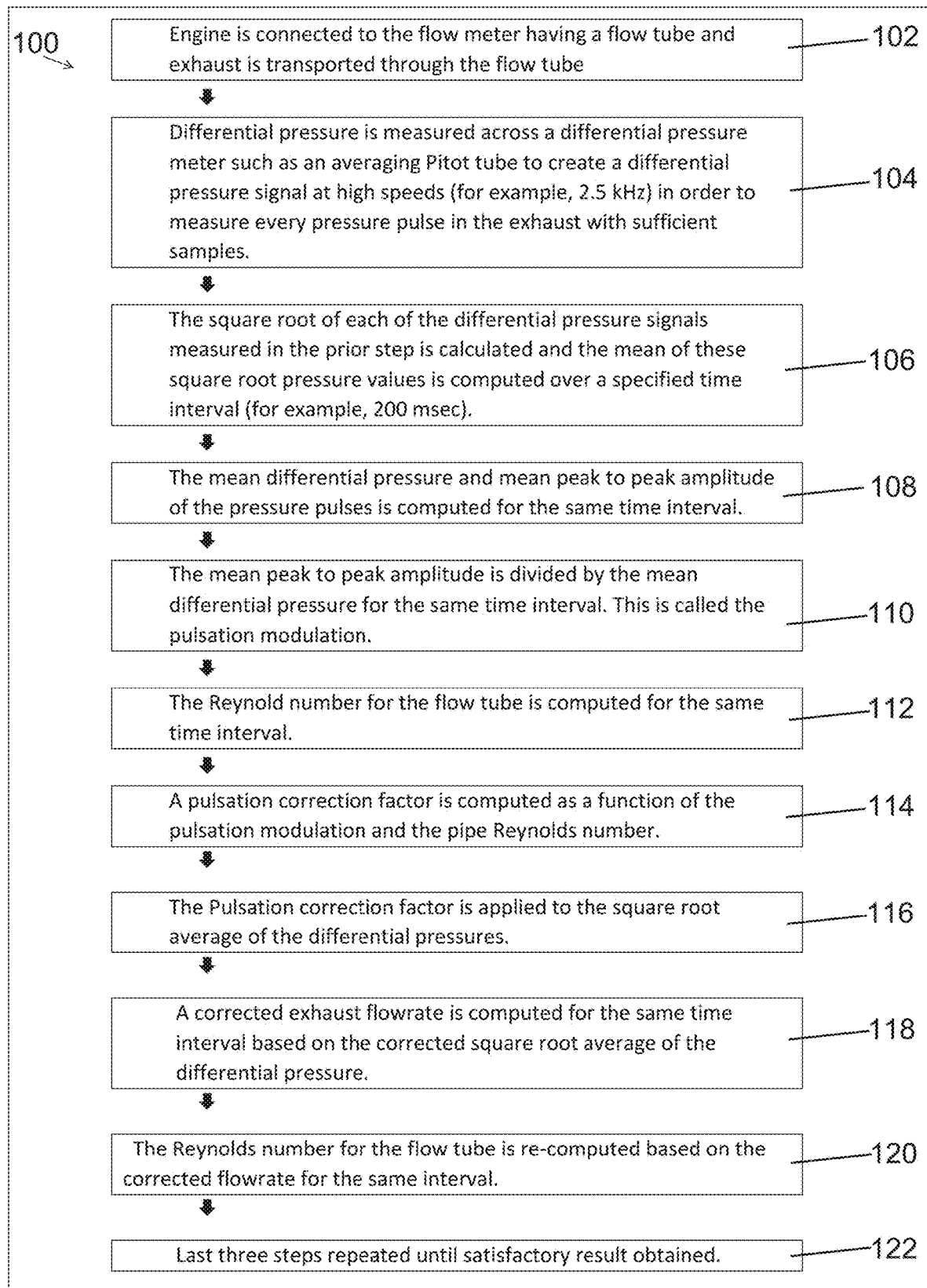
FIG. 7 is a flowchart illustrating a process for exhaust flow measurement pulsation compensation.

As illustrated in the flow chart of FIG. 7, computer 40 is responsive to differential pressure meter 24 and adapted to sample pressure sensors 34 at a rate that is greater than the pulsation of exhaust flow to obtain a differential pressure signal 104. In the illustrated embodiment, such sampling rate is 2.5 KHz or greater. The computer 40 is responsive to the differential pressure signal to compute a mean differential pressure and a mean peak to peak amplitude of pressure pulses in the signal 108. A Reynolds number for flow tube 22 is calculated using conventional techniques 112 for the interval set forth in 106. The computer 40 is adapted to determine a compensation factor as a function of the mean magnitude of pressure pulses 114 and adjusts the mean differential pressure value as a function of the compensation factor to obtain an engine exhaust flow value that is flow pulsation compensated 118.

The computer 40 is adapted to calculate a mean magnitude of pressure from a square root average of the differential pressure signal. The computer 40 calculates the mean magnitude of pressure from the square root average of the differential pressure signal over an interval of time, such as 200 ms for example 106. The computer 40 is adapted to compute the compensation factor from a pulsation correction factor and a Reynold number of the flow tube. The Reynolds number is calculated over the same interval used for obtaining mean magnitude of the pressure using conventional calculation techniques. The pulsation correction factor is a function of mean peak to peak amplitude of pressure pulses divided by the mean magnitude of pressure. The computer 40 is adapted to adjust the mean magnitude of pressure by the compensation factor and re-computes the Reynolds number 120 and the compensation factor in an iterative process 122.

As an example, pulsation correction factor=f (pulsation modulation, Reynolds number) where:
DP_Mod=Press_amplitude/Press_mean
Mod_Corrector=m*DP_Mod+b
Contribution=1−((RE_avg−min_RE)/(max_RE−min_RE))
Flow_Corrector=(Mod_corrector*contribution)+(1−contribution)
Where:
m=(corrector_max−1)/(mod_max−mod_min);
b=1−(mod_min*m)
Corrector_max is a constant, equal to the maximum correction factor to be applied in the linear function.
Corrector_min is a constant, equal to the minimum correction factor that is to be applied in the linear function.
RE min and RE max is a range of pipe Reynolds numbers where the modulation correction is weighted from weighted. At RE min, the correction is applied fully.
At RE max, the correction is not applied. For example, RE min=10,000 and RE max=15,000.

Figure 5:
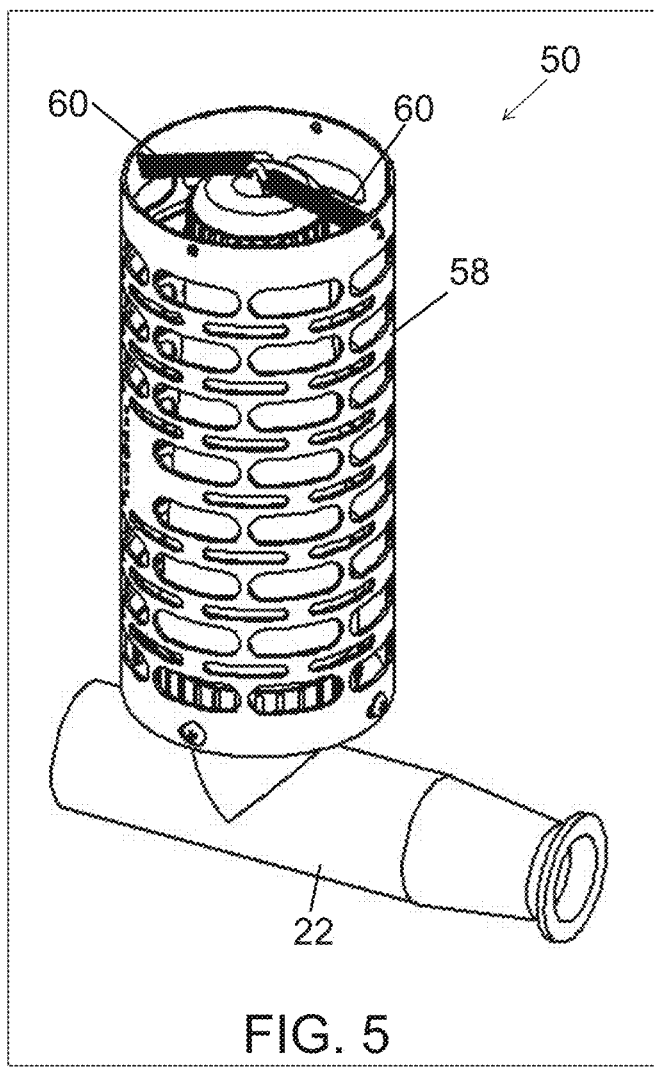
FIG. 5 is a perspective view of a dampener.
Figure 6:
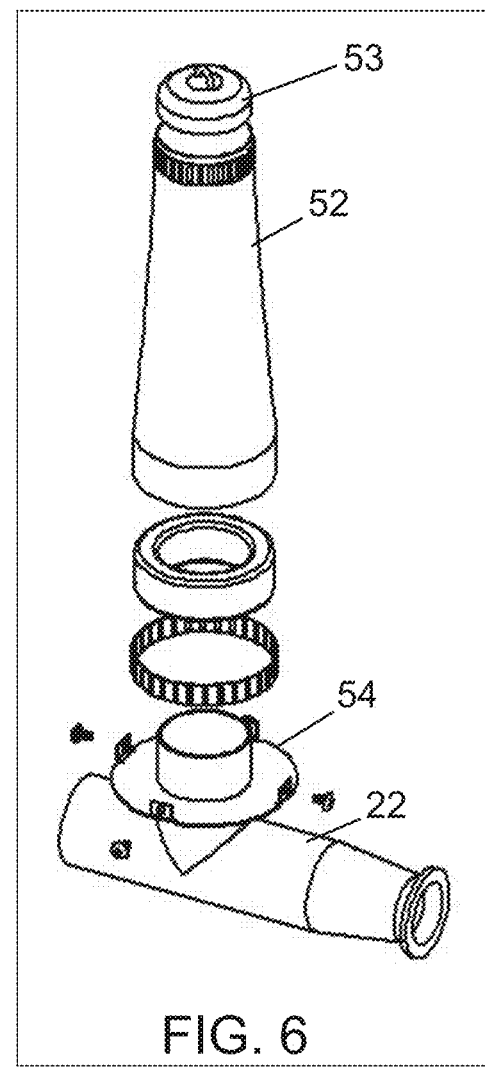
FIG. 6 is an exploded perspective view of the dampener in FIG. 5 with the shield removed to reveal internal components.

In one embodiment, as illustrated in FIGS. 5 and 6, flow rate meter 20 includes a pulsation dampener 50 that is adapted to mechanically reduce the magnitude of flow pulsation in flow tube 22. In the illustrated embodiment, dampener 50 is positioned between the engine exhaust and sensing assembly 36. Pulsation dampener 50 includes a flexible bag 52 that is made of silicone. The bag 52 expands and contracts in response to engine pulsations thus mechanically absorbing a portion of the gas flow pulsations. A shield 58 surrounds bag 52. A mounting flange 54 provides a mount interface for both shield 58 and bag 52 to mount them to flow tube 22. Preferably, the shield 58 is coupled to the flow tube 22 at mounting flange 54 at one end portion of the shield 58 and the shield 58 supports bag 52 at an opposite end portion of the shield 58 with multiple opposing mounting springs 60. Mounting springs 60 are disposed between an end portion of the shield 58 and an end portion of the bag 52, such as at an end cap 53 of the bag 52.

Figure 8:
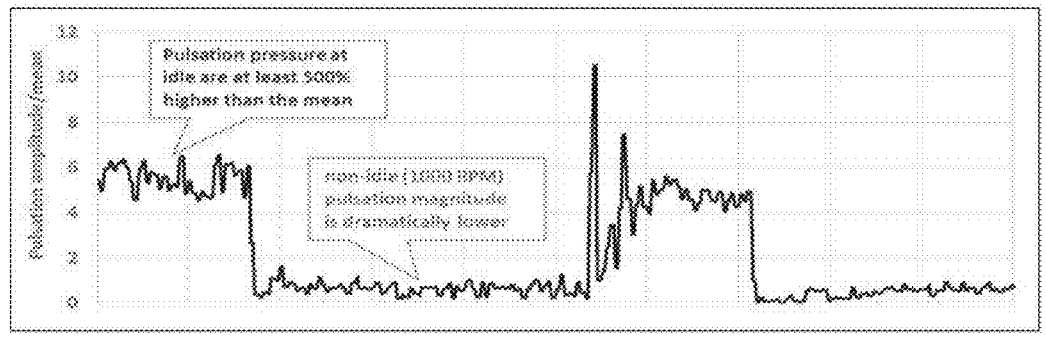
FIG. 8 is a pressure diagram of mean pulsation amplitude at engine idle speed and non-idle speed.
Figure 9:
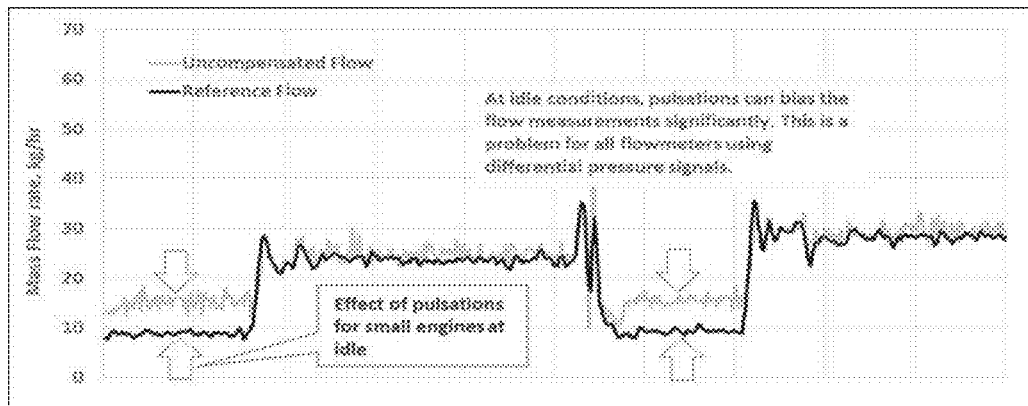
FIG. 9 is an emission mass flow rate diagram illustrating effect of flow pulsation on mass flow rate measurement signal without pulsation compensation.
Figure 10:
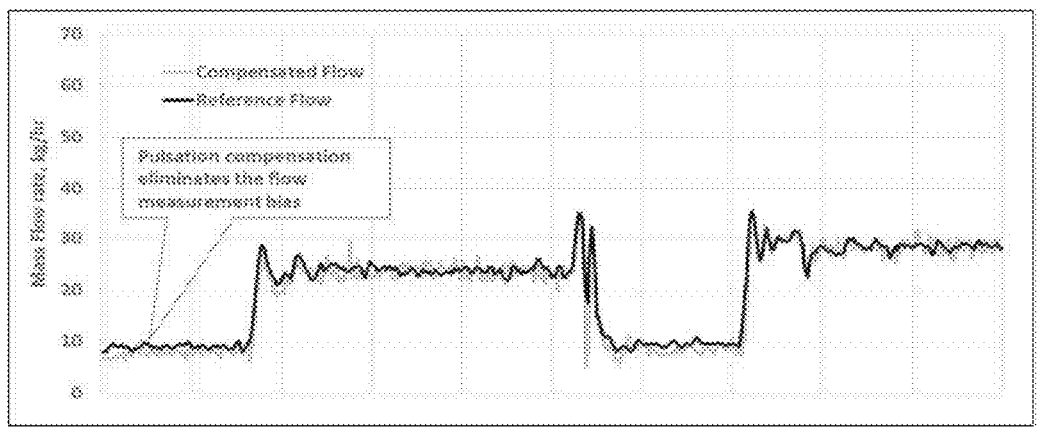
FIG. 10 is the same diagram as FIG. 9 illustrating effect of pulsation compensation according to an embodiment of the invention.

FIGS. 8-10 show examples of raw and compensated exhaust flows on a 1.6 liter gasoline engine. High speed pressure measurements were recorded at idle on a variety of vehicles and analyzed. Simultaneously, reference flowrates were measured on a second flowmeter after flowing the exhaust through a large barrel, acting as a pneumatic capacitor and eliminating the pulsations. When possible, the vehicles mass air flow sensor (not shown) was used to verify the reference flow measurement. As shown in FIG. 8, at idle conditions the pressure pulsations measure up to 600% above the mean pressure. At only a slight increase in engine speed up to 1000 RPM, the pulsation phenomenon disappears, and the pulsations are only around 100% above the mean. At idle conditions, pulsation bias flow measurements are recorded using prior flow measurement techniques, as indicated by arrows in FIG. 9, where a high bias exists in the raw (uncompensated) mass flow measurement. FIG. 10 shows compensated exhaust flow using techniques disclosed herein, where the pulsation effect is mostly eliminated. The specific algorithm used to compute the pulsation correction factor is a function of the details of the hardware used in construction of the flow meter and is determinable by routine testing with various engines in various use conditions as would be understood by the skilled artisan.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An engine exhaust flow meter, comprising:
a flow tube and a differential pressure meter that is adapted to measure differential pressure in an exhaust flow through the flow tube; and
a computer adapted to sample said differential pressure meter at a rate that is greater than the pulsation of the exhaust flow to obtain a differential pressure signal;
said computer responsive to said differential pressure signal to compute a mean differential pressure value;
said computer responsive to said differential pressure signal to compute a mean magnitude of pressure pulses;
said computer is adapted to determine a compensation factor as a function of the mean magnitude of pressure pulses and adjusts said mean differential pressure value as a function of the compensation factor to obtain an engine exhaust flow value that is flow pulsation compensated.

2. The engine exhaust flow meter as claimed in claim 1 including a pulsation dampener that is adapted to mechanically reduce a magnitude of flow pulsation in said flow tube.

3. The engine exhaust flow meter as claimed in claim 2 wherein said pulsation dampener comprises a flexible bag.

4. The engine exhaust flow meter as claimed in claim 3 wherein said bag is made of silicone.

5. The engine exhaust flow meter as claimed in claim 3 including a shield surrounding said bag.

6. The engine exhaust flow meter as claimed in claim 5 wherein said shield is attached to the flow tube at one end portion of the shield and supports said bag at an opposite end portion of the shield.

7. The engine exhaust flow meter as claimed in claim 1 wherein said differential pressure meter comprises a pitot tube disposed in said flow tube and a differential pressure sensor configured to sense pressure across said pitot tube and produce a differential pressure signal that is responsive to forward and reverse flow in the flow tube.

8. The engine exhaust flow meter as claimed in claim 7 wherein said differential pressure sensor comprises a plurality of differential pressure sensors connected in parallel.

9. The engine exhaust flow meter as claimed in claim 1 wherein said computer is adapted to calculate the mean magnitude of pressure from a square root average of the differential pressure signal.

10. The engine exhaust flow meter as claimed in claim 9 wherein said computer calculates the mean magnitude of pressure from the square root average of the differential pressure signal over an interval of time.

11. The engine exhaust flow meter as claimed in claim 10 wherein said computer is adapted to compute the compensation factor from a pulsation correction factor and a Reynolds number of the flow tube, the pulsation correction factor is a function of mean peak to peak amplitude of pressure pulses divided by the mean magnitude of pressure.

12. The engine exhaust flow meter as claimed in claim 1 wherein said computer is adapted to compute the compensation factor from a pulsation correction factor and a Reynolds number of the flow tube, the pulsation correction factor is a function of mean peak to peak amplitude of pressure pulses divided by the mean magnitude of pressure.

13. The engine exhaust flow meter as claimed in claim 11 wherein said computer is adapted to adjust the mean magnitude of pressure by the compensation factor and re-computes the compensation factor in an iterative process.

14. The engine exhaust flow meter as claimed in claim 1 wherein said computer is adapted to adjust the mean magnitude of pressure by the compensation factor and re-computes the compensation factor in an iterative process.

15. An engine exhaust flow meter, comprising:
a flow tube and a differential pressure meter that is adapted to measure differential pressure in exhaust flow through the flow tube;
a computer adapted to sample said differential pressure meter at a rate that is greater than the pulsation of the exhaust flow to obtain a differential pressure signal;
a pulsation dampener that is adapted to mechanically reduce a magnitude of flow pulsation in said flow tube; and
said differential pressure meter comprises a pitot tube disposed in said flow tube and a differential pressure sensor configured to sense pressure across said pitot tube, producing a differential pressure signal that is responsive to forward and reverse flow in the flow tube;
said computer responsive to said differential pressure signal to compute a mean differential pressure value;
said computer responsive to said differential pressure signal to compute a mean magnitude of pressure pulses;
said computer is adapted to determine a compensation factor as a function of the mean magnitude of pressure pulses and adjusts said mean differential pressure value as a function of the compensation factor to obtain an engine exhaust flow value that is flow pulsation compensated.

16. The engine exhaust flow meter as claimed in claim 15 wherein said pulsation dampener comprises a flexible bag.

17. The engine exhaust flow meter as claimed in claim 16 including a shield surrounding said bag.

18. The engine exhaust flow meter as claimed in claim 15 wherein said differential pressure sensor comprises a plurality of differential pressure sensors connected in parallel.

19. The engine exhaust flow meter as claimed in claim 15 wherein said computer is adapted to compute the compensation factor from a pulsation correction factor and a Reynolds number of the flow tube, the pulsation correction factor is a function of mean peak to peak amplitude of pressure pulses divided by the mean magnitude of pressure and said computer is adapted to adjust the mean magnitude of pressure by the compensation factor and re-computes the compensation factor in an iterative process.

20. A method of measuring engine exhaust flow rate, said method comprising:
connecting the engine exhaust to a flow tube having a differential pressure meter that is adapted to measure differential pressure in exhaust flow through the flow tube;

sampling said differential pressure meter at a rate that is greater than the pulsation of exhaust flow to obtain a differential pressure signal;

computing a mean differential pressure value from said differential pressure signal;

computing a mean magnitude of pressure pulses from said differential pressure signal;

determining a compensation factor as a function of the mean magnitude of pressure pulses and adjusting said mean differential pressure value as a function of the compensation factor to obtain an engine exhaust flow value that is flow pulsation compensated.

\* \* \* \* \*